United States Patent
Nishio

(10) Patent No.: US 8,345,160 B2
(45) Date of Patent: Jan. 1, 2013

(54) SYNCHRONOUS SIGNAL CONVERSION CIRCUIT, SIGNAL PROCESSING SYSTEM INCLUDING IT, AND SYNCHRONOUS SIGNAL CONVERSION METHOD

(75) Inventor: Yuki Nishio, Kyoto (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 12/809,438

(22) PCT Filed: Aug. 25, 2008

(86) PCT No.: PCT/JP2008/002301
§ 371 (c)(1),
(2), (4) Date: Jun. 18, 2010

(87) PCT Pub. No.: WO2009/084128
PCT Pub. Date: Jul. 9, 2009

(65) Prior Publication Data
US 2011/0228165 A1  Sep. 22, 2011

(30) Foreign Application Priority Data
Dec. 27, 2007  (JP) .................. 2007-337638

(51) Int. Cl.
*H04N 9/475* (2006.01)
*H04N 5/06* (2006.01)
*H04N 9/45* (2006.01)
*H04N 5/04* (2006.01)

(52) U.S. Cl. .................... 348/518; 348/501; 348/521

(58) Field of Classification Search ........... 348/500–569
See application file for complete search history.

(56) References Cited

U.S. PATENT DOCUMENTS

| 4,758,890 A | * | 7/1988 | Boyce ........................... 348/540 |
| 4,839,745 A | * | 6/1989 | Tindall .......................... 386/268 |
| 4,954,784 A | | 9/1990 | Kitamura |
| 6,297,850 B1 | | 10/2001 | Han et al. |
| 2005/0237429 A1 | | 10/2005 | Grundmeyer et al. |

FOREIGN PATENT DOCUMENTS

| JP | 07-143507 | 6/1995 |
| JP | 2001-008202 | 1/2001 |
| JP | 2003-169228 | 6/2003 |
| JP | 2005-318610 | 11/2005 |
| JP | 2006-115208 | 4/2006 |

OTHER PUBLICATIONS

CEA-861-D, A DTV Profile for Uncompressed High Speed Digital Interfaces, dated Apr. 17, 2006.

\* cited by examiner

*Primary Examiner* — Michael Lee
(74) *Attorney, Agent, or Firm* — McDermott Will & Emery LLP

(57) ABSTRACT

A synchronous signal conversion circuit converts a first synchronous signal, which is transmitted with a data signal, to a second synchronous signal conforming to a predetermined standard. In the synchronous signal conversion circuit, a transition detection circuit detects transition of the first synchronous signal. A synchronous signal generation circuit generates a second synchronous signal in response to a detection result by the transition detection circuit. An output timing control circuit delays the second synchronous signal generated by the synchronous signal generation circuit so that the second synchronous signal synchronizes with the data signal.

17 Claims, 15 Drawing Sheets

SYNCHRONOUS SIGNAL CONVERSION CIRCUIT, SIGNAL PROCESSING SYSTEM INCLUDING IT, AND SYNCHRONOUS SIGNAL CONVERSION METHOD

RELATED APPLICATIONS

This application is the U.S. National Phase under 35 U.S.C. §371 of International Application No. PCT/JP2008/002301, filed on Aug. 25, 2008, which in turn claims the benefit of Japanese Application No. 2007-337638, filed on Dec. 27, 2007, the disclosures of which Applications are incorporated by reference herein.

TECHNICAL FIELD

The present invention relates to synchronous signal conversion circuits converting input synchronous signals, which are transmitted with data signals, to output synchronous signals conforming to predetermined standards, signal processing systems including the circuits, and synchronous signal conversion methods.

BACKGROUND ART

Conventionally, in data transmission technology, transmission systems of data signals and synchronous signals are defined by predetermined standards. For example, in a digital visual interface (DVI) which is an interface standard for input/output of video, and a high-definition multimedia interface (HDMI) which is an interface standard for input/output of video and sound, pulse width of horizontal synchronous signals, length of active periods of vertical synchronous signals, positions of valid periods of data signals (i.e., periods in which valid data exists), etc. are defined by a digital video transmission standard called "CEA-861D," as shown in FIG. 15.

In recent years, in order to improve compatibility between devices, standardization has been promoted in various technical fields. For example, the HDMI has been widely used not only for digital electronic apparatuses such as digital televisions and DVD players but also in technical fields such as mobile apparatuses represented by digital cameras and mobile phones.

CITATION LIST

Patent Document

PATENT DOCUMENT 1: Japanese Patent Publication No. 2005-318610

Non-Patent Document

NON-PATENT DOCUMENT 1: CEA-861-D, A DTV Profile for Uncompressed High Speed Digital Interfaces

SUMMARY OF THE INVENTION

Technical Problem

In order to employ a standard, specifications of apparatuses need to be changed to transmit and receive data signals and synchronous signals which conform to the standard. However, costs for development are needed to modify the specifications which have been already employed.

It is an objective of the present invention to provide a synchronous signal conversion circuit capable of converting input synchronous signals to output synchronous signals which conform to a predetermined standard.

Solution to the Problem

According to an aspect of the present invention, a synchronous signal conversion circuit for converting a first synchronous signal, which is transmitted with a data signal, to a second synchronous signal conforming to a predetermined standard. The circuit includes a transition detection circuit configured to detect transition of the first synchronous signal; a synchronous signal generation circuit configured to generate the second synchronous signal in response to a detection result by the transition detection circuit; and an output timing control circuit configured to delay the second synchronous signal generated by the synchronous signal generation circuit so that the second synchronous signal synchronizes with the data signal.

In the above-described synchronous signal conversion circuit, the first synchronous signal can be converted to the second synchronous signal conforming to the predetermined standard. By using this synchronous signal conversion circuit, an existing system (which does not correspond to the predetermined standard) can conform to the predetermined standard without modifying the specification of the system.

According to another aspect of the present invention, a synchronous signal conversion method is the method of converting a first synchronous signal, which is transmitted with a data signal, to a second synchronous signal conforming to a predetermined standard. The method includes the steps of: (a) detecting transition of the first synchronous signal; (b) generating the second synchronous signal in response to a detection result obtained in the step (a); and (c) delaying the second synchronous signal generated in the step (b) so that the second synchronous signal synchronizes with the data signal.

Advantages of the Invention

As described above, an input synchronous signal can be converted to an output synchronous signal conforming to a predetermined standard, and thus, an existing system can conform to the predetermined standard without changing the specification of the system.

Figure 1:
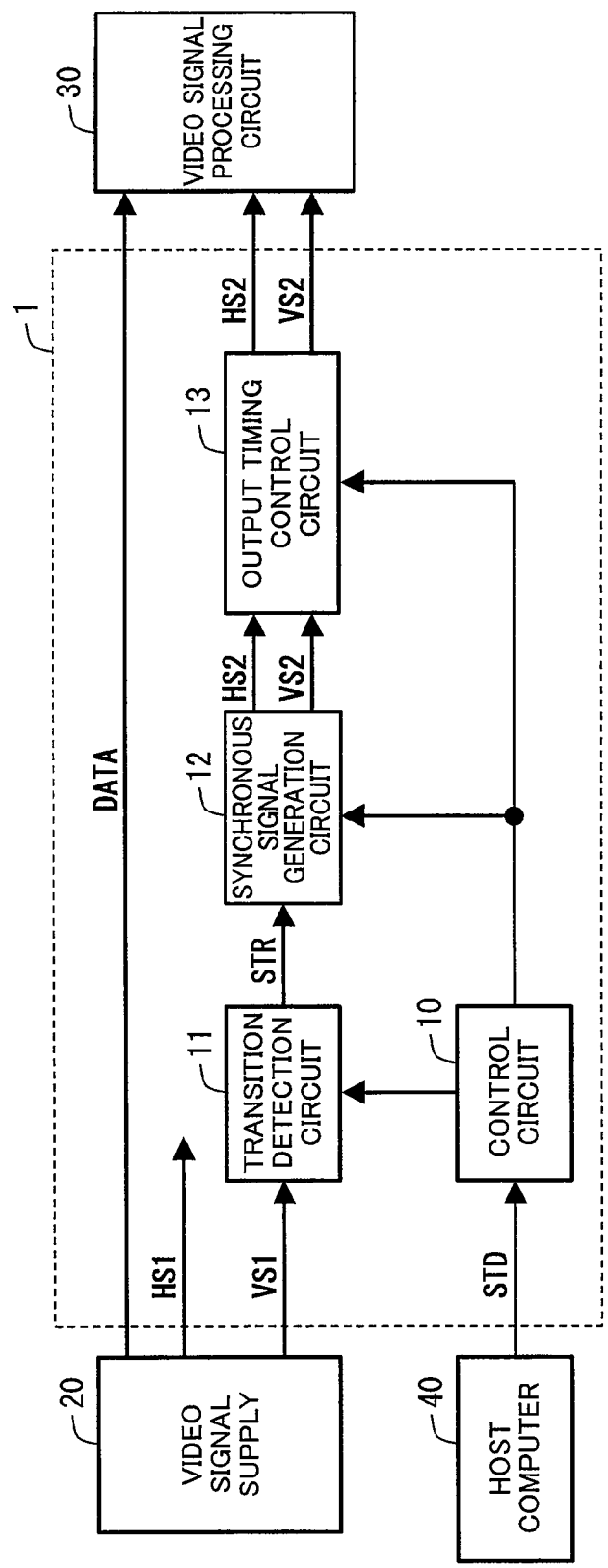
FIG. 1 is a configuration diagram of a synchronous signal conversion circuit according to a first embodiment of the present invention.

DESCRIPTION OF REFERENCE CHARACTERS 1, 2, 3, 3a Synchronous Signal Conversion Circuits
20 Video Signal Supply
30 Video Signal Processing Circuit
40 Host Computer
10 Control Circuit
11 Transition Detection Circuit
12 Synchronous Signal Generation Circuit
13 Output Timing Control Circuit
101V, 101H Rising Edge Detection Circuits
102V, 102H Falling Edge Detection Circuits
104H Horizontal Synchronous Signal Generation Circuit
104V Vertical Synchronous Signal Generation Circuit
111H, 111V Counters
112H, 112V Level Shift Circuits
105 Supply Control Circuit
121 Pulse Storage Circuit
122 AND Circuit
123 Selector
21 Generation Start Control Circuit
201H, 201V Transition Detection Circuits
202 Field Determination Circuit
203 Selector
SEL1, SEL2 Selectors

DESCRIPTION OF EMBODIMENTS

Embodiments of the present invention will be described hereinafter in detail with reference to the drawings. In the drawings, the same reference characters have been used to designate identical or equivalent elements, and explanation thereof is not repeated.

First Embodiment

FIG. 1 illustrates a configuration of a synchronous signal conversion circuit 1 according to a first embodiment of the present invention.

The synchronous signal conversion circuit 1 is provided in a video signal processing system such as a digital television, a DVD player, a digital camera, and a mobile phone. The circuit converts a horizontal synchronous signal HS1 and a vertical synchronous signal VS1 which conform to the specification of a video signal supply 20, to a horizontal synchronous signal HS2 and a vertical synchronous signal VS2 which conform to a standard (e.g., HDMI or DVI). Then, the circuit outputs the signals to a video signal processing circuit 30 which performs data signal processing conforming to the standard.

The video signal processing system includes a host computer 40, etc. in addition to the synchronous signal conversion circuit 1, the video signal supply 20, etc. and the video signal processing circuit 30. The host computer 40 supplies the synchronous signal conversion circuit 1 with information on the specification (specification information STD) of the video signal supply 20. The specification information STD defines parameters (e.g., the length of the period, the length of an active period, the position of a valid period, and the type of an edge defining the period) of the horizontal synchronous signal HS1 and the vertical synchronous signal VS1.

[Synchronous Signal Conversion Circuit]

The synchronous signal conversion circuit 1 includes a control circuit 10, a transition detection circuit 11, a synchronous signal generation circuit 12, and an output timing control circuit 13. The transition detection circuit 11 outputs a start pulse STR when detecting transition of the vertical synchronous signal VS1. The synchronous signal generation circuit 12 generates the synchronous signals HS2 and VS2 in response to the start pulse STR from the transition detection circuit 11. The output timing control circuit 13 delays the synchronous signals HS2 and VS2 generated by the synchronous signal generation circuit 13 so that the synchronous signals HS2 and VS2 synchronize with the data signal DATA.

[Control Circuit]

The control circuit 10 stores information on a standard (i.e., standard information) in advance. The standard information defines parameters (e.g., the length of the period, the length of an active period, the position of a valid period, and the type of an edge defining the period) of the horizontal synchronous signal HS2 and the vertical synchronous signal VS2.

Furthermore, the control circuit 10 receives the specification information STD from the host computer 40, and controls the transition detection circuit 11, the synchronous signal generation circuit 12, the output timing control circuit 13 based on the difference between the specification information STD and the standard information. Specifically, the control circuit 10 determines the type of the edge to be detected by the transition detection circuit 11, the period and the active period of a synchronous signal to be generated by the synchronous signal generation circuit 12, and the delay amount of the output timing control circuit 13, etc.

[Transition Detection Circuit]

Figure 2:
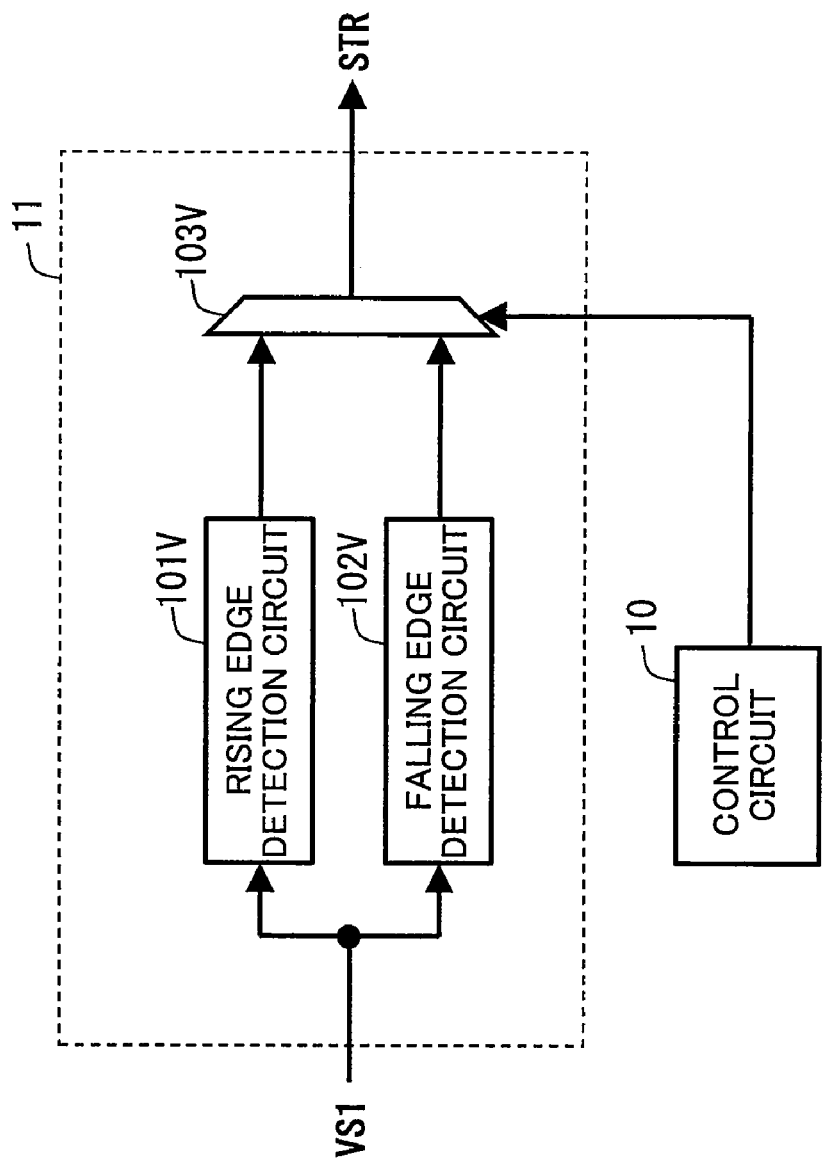
FIG. 2 is a configuration diagram of a transition detection circuit shown in FIG. 1.

As shown in FIG. 2, the transition detection circuit 11 includes a rising edge detection circuit 101V detecting a rising edge of the vertical synchronous signal VS1, a falling edge detection circuit 102V detecting a falling edge of the vertical synchronous signal VS1, and a selector 103V operating in response to control by the control circuit 10. For example, the control circuit 10 allows the selector 103V to select a detection result by the rising edge detection circuit 101V as a start pulse STR, when the period and the active period of the vertical synchronous signal VS1 are defined by using the rising edge of the vertical synchronous signal VS1 as a reference.

[Synchronous Signal Generation Circuit]

Figure 3:
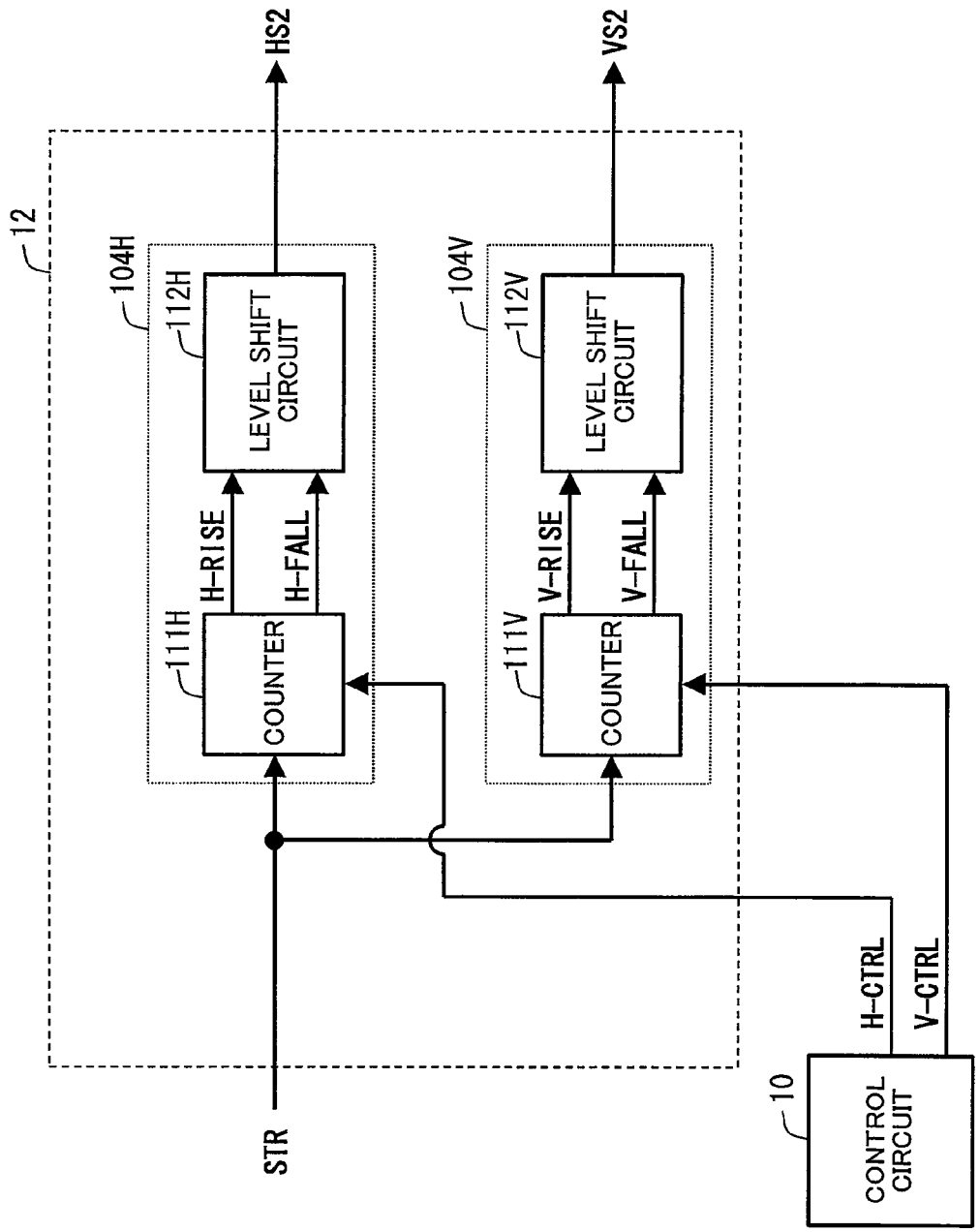
FIG. 3 is a configuration diagram of the synchronous signal generation circuit shown in FIG. 1.

As shown in FIG. 3, the synchronous signal generation circuit 12 includes a horizontal synchronous signal generation circuit 104H and a vertical synchronous signal generation circuit 104V which generate the horizontal synchronous signal HS2, and the vertical synchronous signal VS2, respectively, in response to the start pulse STR. The horizontal synchronous signal generation circuit 104H includes a counter 111H and a level shift circuit 112H, and the vertical synchronous signal generation circuit 104V includes a 111V, and a level shift circuit 112V.

The counters 111H and 111V operate in response to control signals H-CTRL and V-CTRL from the control circuit 10. The control signals H-CTRL and V-CTRL indicate active period standard values defining the length of the active periods of the synchronous signals HS2 and VS2, and the standard period values defining the length of the periods of the synchronous signals HS2 and VS2.

The level shift circuits 112H and 112V shift the logic levels of the synchronous signals HS2 and VS2 to low levels in response to falling signals H-FALL and V-FALL, respectively, and shift the logic levels of the synchronous signals HS2 and VS2 to high levels in response to rising signals H-RISE and V-RISE.

Figure 4:
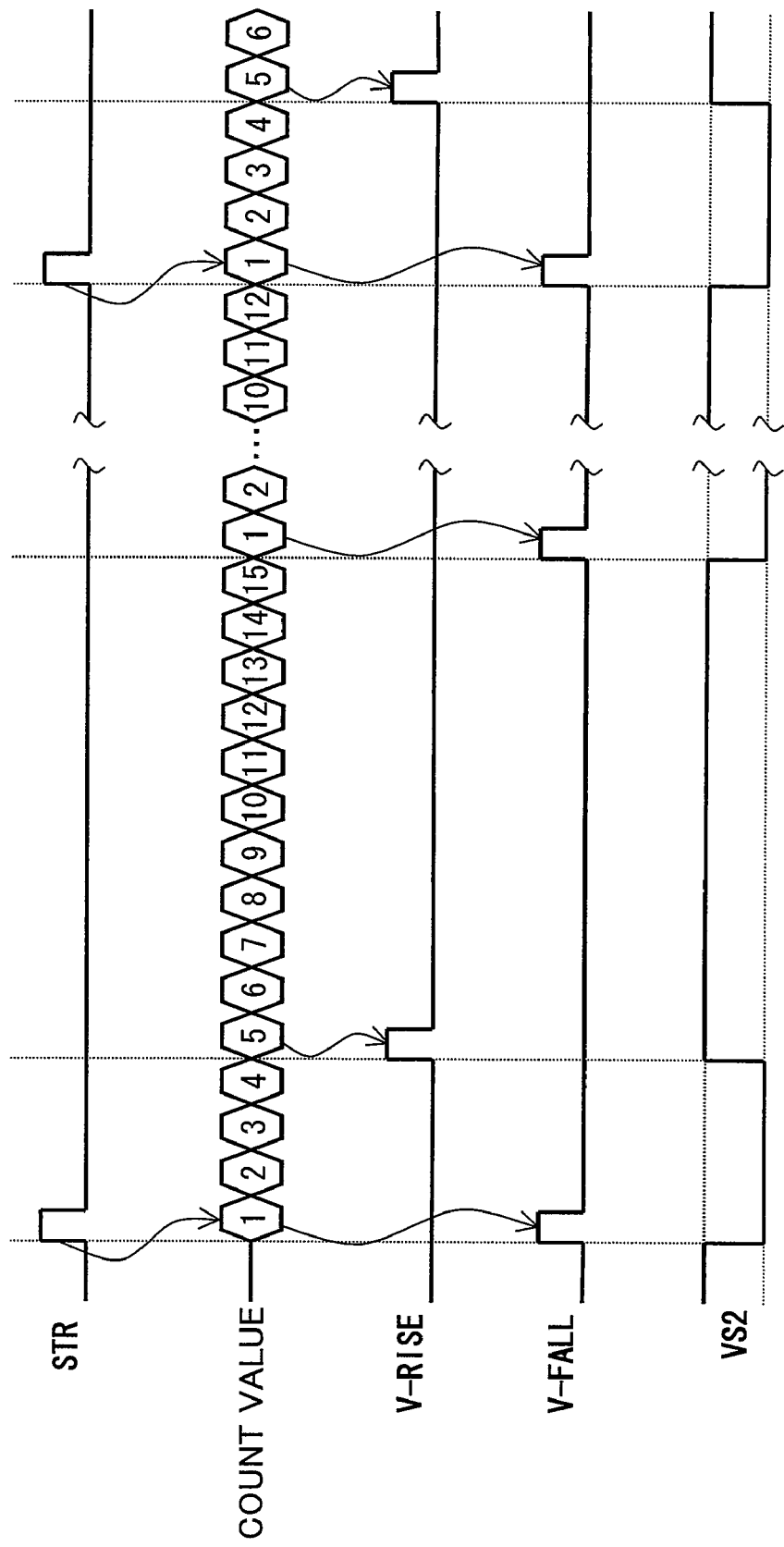
FIG. 4 illustrates operation of the synchronous signal generation circuit shown in FIG. 3.

As shown in FIG. 4, the counter 111V starts counting the start pulse STR to be supplied, and outputs the falling signal V-FALL when the start pulse STR is supplied. This allows the synchronous signal VS2 to transition from the high level to the low level.

Next, when a count value of the counter 111V reaches an active period standard value ("5" in FIG. 4) indicated by the control signal V-CTRL, the counter 111V outputs the rising signal V-RISE. This allows the synchronous signal VS2 to transition from the low level to the high level. Then, when the count value of the counter 111V reaches a period standard value ("15" in FIG. 4) indicated by the control signal V-CTRL, the counter 111V restarts counting after resetting the count value, and outputs the falling signal V-FALL again.

When the start pulse STR is supplied while the counter 111V continues to count, the counter 111V restarts counting after resetting the count value, and outputs the falling signal V-FALL.

As such, the vertical synchronous signal generation circuit 112V generates the vertical synchronous signal VS2 conforming to a standard. Similarly, the horizontal synchronous signal generation circuit 104H executes the above-described operation to generate the horizontal synchronous signal HS2 conforming to a standard.

[Output Timing Control Circuit]

A delay amount of the output timing control circuit 13 is determined based on a time lag between the position of the valid period of the data signal DATA (a period in which valid data exists) and the position of the valid period defined by the vertical synchronous signal VS2. Specifically, the control circuit 10 refers to the specification information STD and the standard information. With an increase in the advance amount of the position of the valid period of the vertical synchronous signal VS2 to the position of the valid period of the data signal DATA, the control circuit 10 increases the delay amount of the output timing control circuit 13.

[Operation of Synchronous Signal Conversion Circuit]

Figure 5:
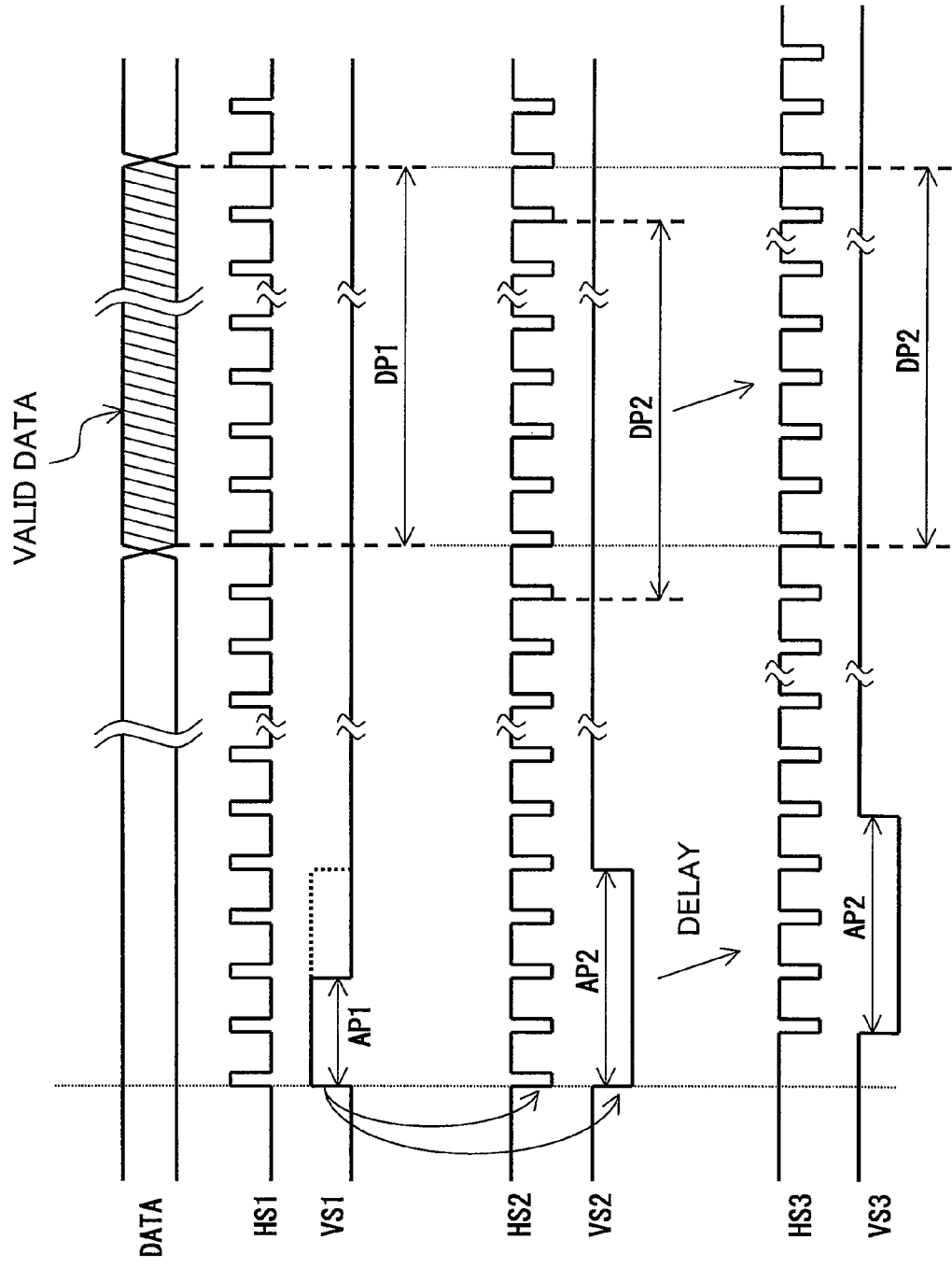
FIG. 5 illustrates operation of the synchronous signal conversion circuit shown in FIG. 1.

Next, operation of the synchronous signal conversion circuit 1 shown in FIG. 1 will be described hereinafter with reference to FIG. 5. It is assumed that the active period AP1 of the vertical synchronous signal VS1 is shorter than an active period AP2 which is defined by a standard. It is assumed that the periods of the synchronous signals HS1 and VS1 are defined using respective rising edges as references, the periods of the synchronous signals HS2 and VS2 are defined using respective falling edges as references. Furthermore, it is assumed that the position of the valid period DP1 of the data signal DATA (i.e., the position of the valid period defined by the rising edge of the vertical synchronous signal VS1) is at a later time than the position of the valid period DP2 defined by the falling edge of the vertical synchronous signal VS2.

When the rising edge of the vertical synchronous signal VS1 conforming to the specification of the video signal supply 20 is detected by the transition detection circuit 11, the synchronous signal generation circuit 12 starts generating the horizontal synchronous signal HS2 and the vertical synchronous signal VS2 which conform to a standard.

Next, the output timing control circuit 13 delays the horizontal synchronous signal HS2 and the vertical synchronous signal VS2 generated by the synchronous signal generation circuit 12 by a delay amount determined by the control circuit 10. Thus, the valid period DP2 corresponds to the valid period DP1 of the data signal DATA. As such, the horizontal synchronous signal HS2 and the vertical synchronous signal VS2 can synchronize with the data signal DATA.

As described above, the horizontal synchronous signal HS1 and the vertical synchronous signal VS1, which do not conform to a standard, can be converted to the horizontal synchronous signal HS2 and the vertical synchronous signal VS2 which conform to the standard. Thus, the video signal processing circuit 30 can normally process the data signal DATA in synchronization with the synchronous signals HS2 and VS2 from the synchronous signal conversion circuit 1 based on the standard. That is, the video signal supply 20 transmits synchronous signals (HS2 and VS2) conforming to a standard. As such, an existing system (which is here the video signal supply 20 not corresponding to the standard) can correspond to the standard without modifying the specification.

(Variation of Synchronous Signal Generation Circuit)

Figure 6:
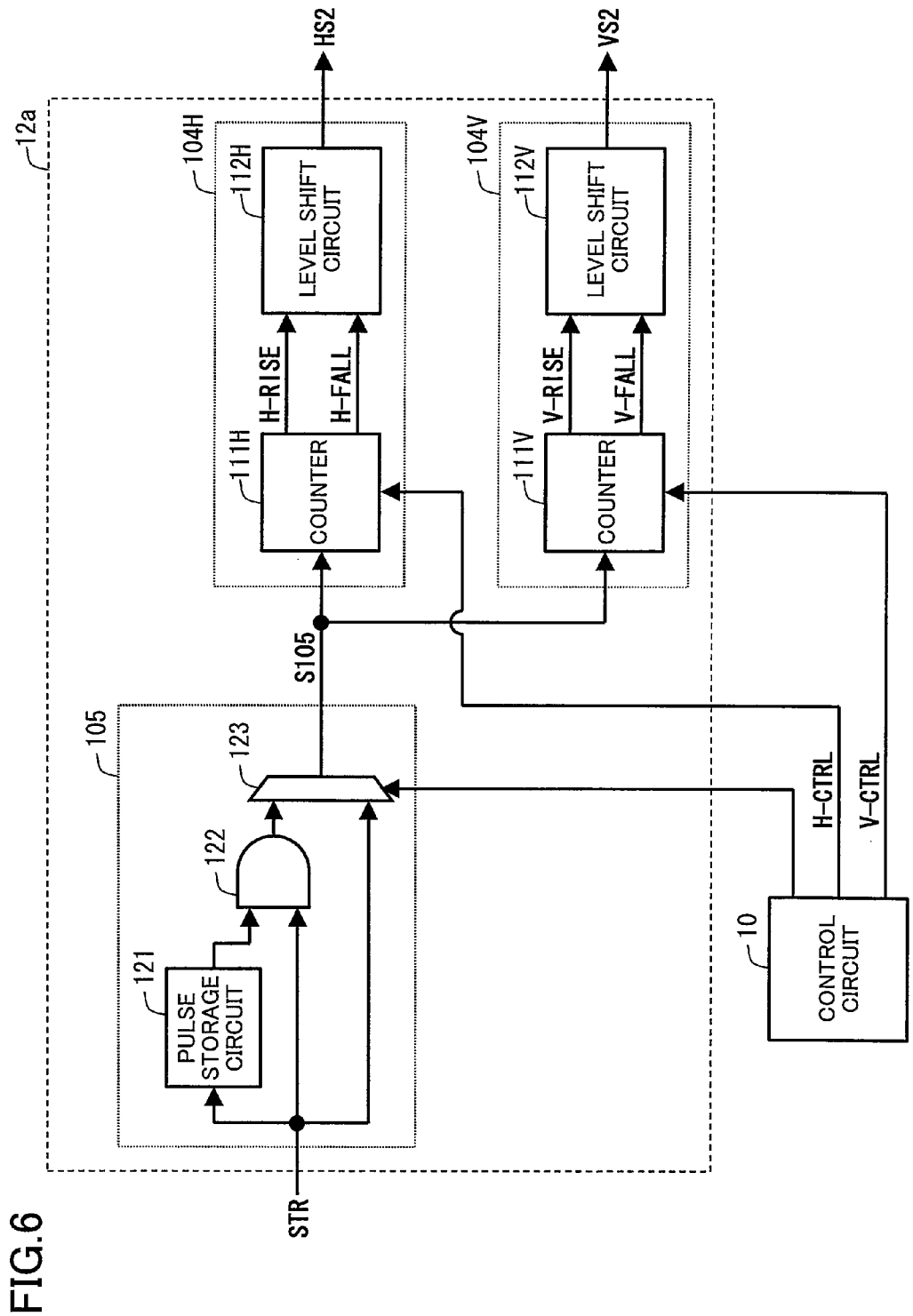
FIG. 6 is a configuration diagram of a variation of the synchronous signal generation circuit shown in FIG. 3.

As shown in FIG. 6, a supply the control circuit 105, which controls supply of a start pulse, may be included in the synchronous signal generation circuit shown in FIG. 3. A synchronous signal generation circuit 12a shown in FIG. 6 can switch between a follow-up mode and a non-follow-up mode. The supply the control circuit 105 includes a pulse storage circuit 121, an AND circuit 122, and a selector 123 operating in response to the control circuit 10. The pulse storage circuit 121 determines the output to the high level at a start-up time or directly after reset of the synchronous signal conversion circuit 1, and maintains the output at the high level until it receives a first start pulse STR. The pulse storage circuit 121 causes the output to transition from the high level to the low level upon receipt of the first start pulse, and maintains the output at the low level even after receiving the second and subsequent start pulses STR.

At the follow-up mode, the control circuit 10 allows the selector 123 to select the start pulse STR. The selector 123 outputs the start pulse STR as an output pulse 5105. Thus, as shown in FIG. 4, the horizontal synchronous signal generation circuit 104H and the vertical synchronous signal generation circuit 104V regenerate the horizontal synchronous signal HS2 and the vertical synchronous signal VS2, respectively, at each time when a start pulse STR is supplied. As such, the generation of the synchronous signals HS2 and VS2 can be followed by the transition of the vertical synchronous signal VS1.

Figure 7:
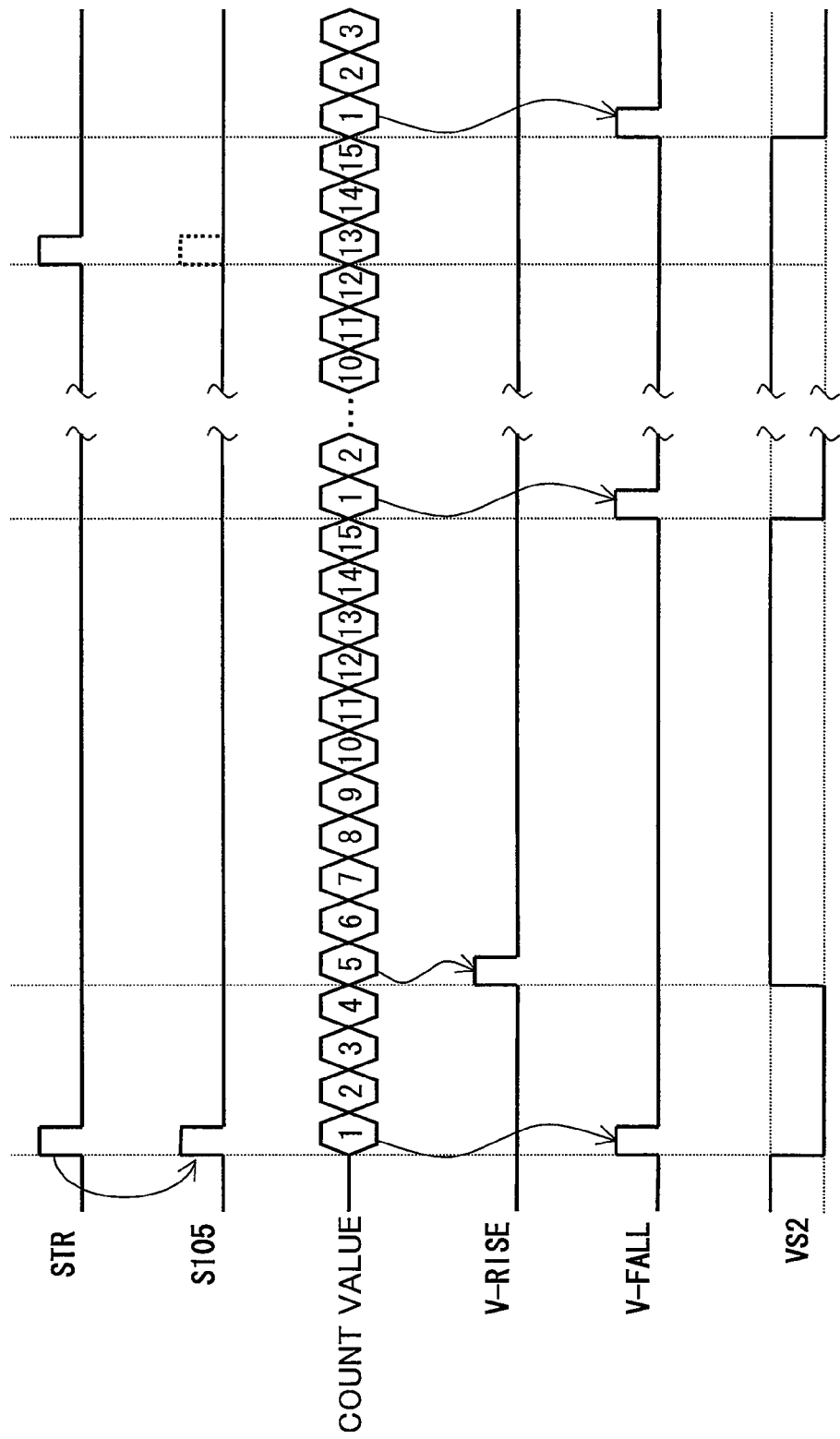
FIG. 7 illustrates operation of the synchronous signal generation circuit shown in FIG. 6.

On the other hand, at a non-follow-up mode, the control circuit 10 allows the selector 123 to select an output of the AND circuit 122. The selector 123 outputs an output of the AND circuit 122 as the output pulse S105. Thus, the horizontal synchronous signal generation circuit 104H and the vertical synchronous signal generation circuit 104V do not regenerate the horizontal synchronous signal HS2 and the vertical synchronous signal VS2, even when the second and subsequent start pulses STR are generated as shown in FIG. 7. As such, the generation of the synchronous signals HS2 and VS2 can prevent follow-up of the transition of the vertical synchronous signal VS1 from transition, thereby reducing effects of a noise component superimposed on the vertical synchronous signal VS1.

Second Embodiment

Figure 11:
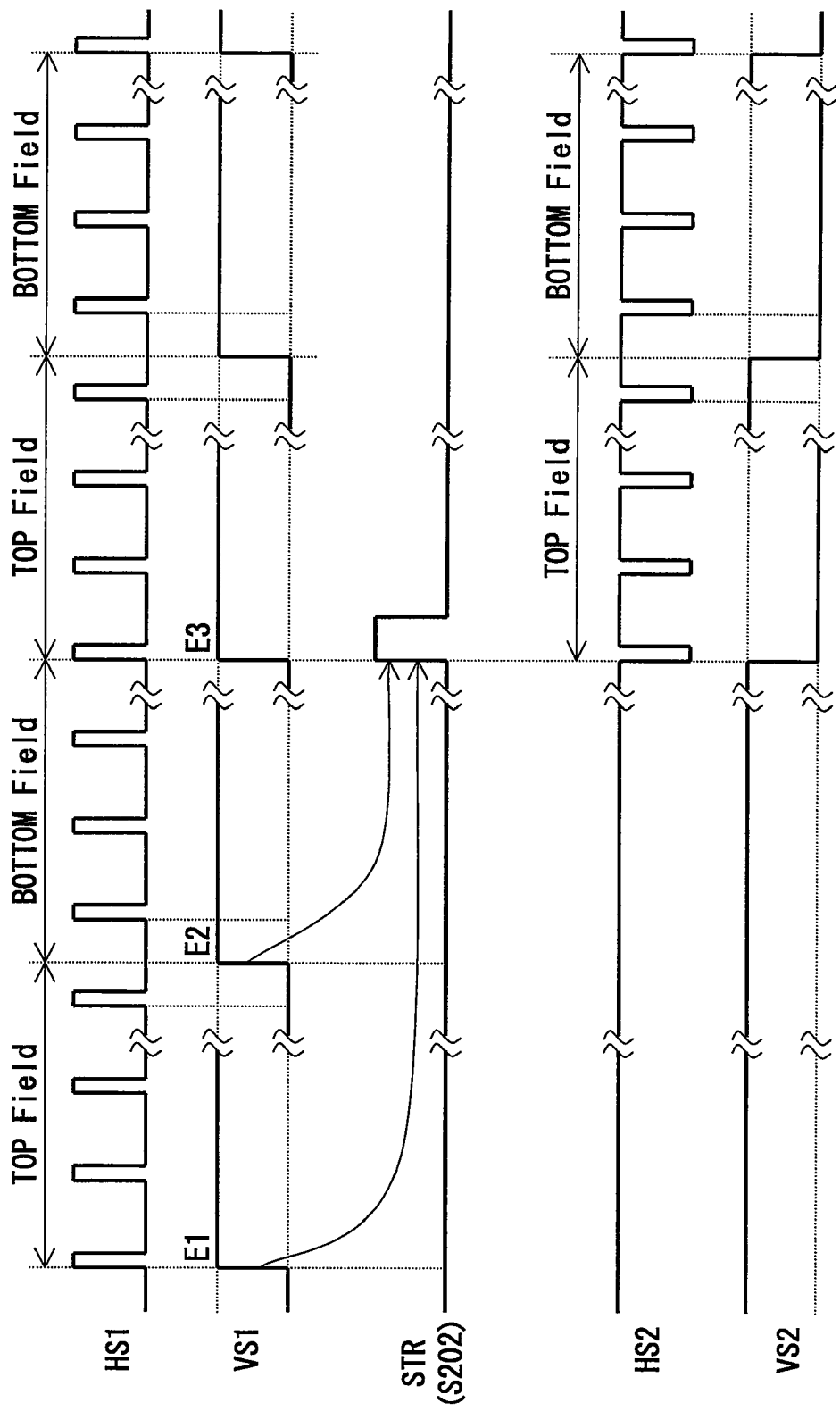
FIG. 11 illustrates operation of the field determination circuit shown in FIG. 8.

A video signal includes a progressive video signal and an interlaced video signal. While each of frames included in the interlaced video signal is divided into top fields and bottom fields, each of the frames included in the progressive video signal is not divided into fields. As shown in FIG. 11, in the interlaced video signal, when the transition point of the vertical synchronous signal VS1 corresponds to the top field, the transition point of the vertical synchronous signal VS1 coincides with the transition point of the horizontal synchronous signal HS1. When the transition point of the vertical synchronous signal VS1 corresponds to the bottom field, the transition point of the vertical synchronous signal VS1 comes later than the transition point of the horizontal synchronous signal HS1 by ½ of the period of the horizontal synchronous signal HS1. Thus, in order to output the synchronous signals HS2 and VS2 corresponding to the interlaced video signal, it is important to determine whether the transition point of the vertical synchronous signal VS1 corresponds to the top field or the bottom field.

[Synchronous Signal Conversion Circuit]

Figure 8:
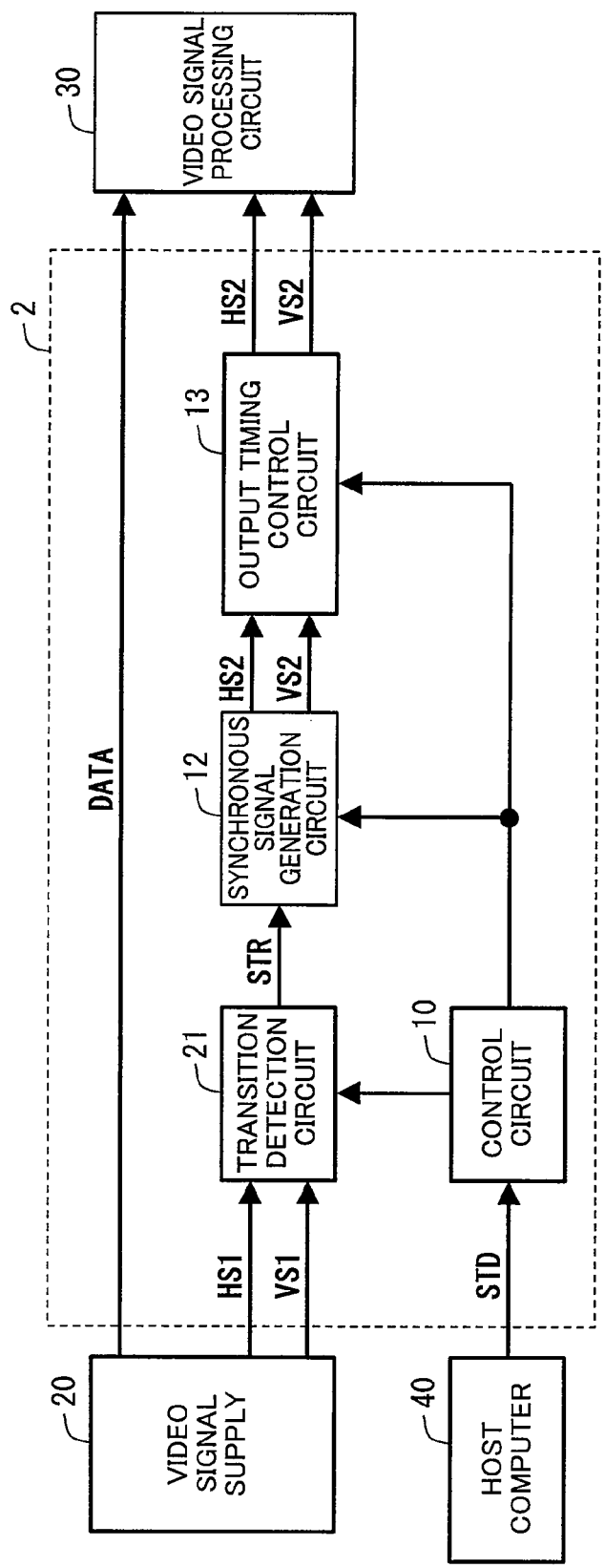
FIG. 8 is a configuration diagram of a synchronous signal conversion circuit according to a second embodiment of the present invention.

FIG. 8 illustrates a configuration of a synchronous signal conversion circuit according to a second embodiment of the present invention. A synchronous signal conversion circuit 2 accepts not only a progressive video signal but also an interlaced video signal, and includes a transition detection circuit 21 instead of the transition detection circuit 11 shown in FIG. 1. The other elements are similar to those shown in FIG. 1. The transition detection circuit 21 receives the horizontal synchronous signal HS1 and the vertical synchronous signal VS1, and executes field determination and error detection.

[Transition Detection Circuit]

Figure 9:
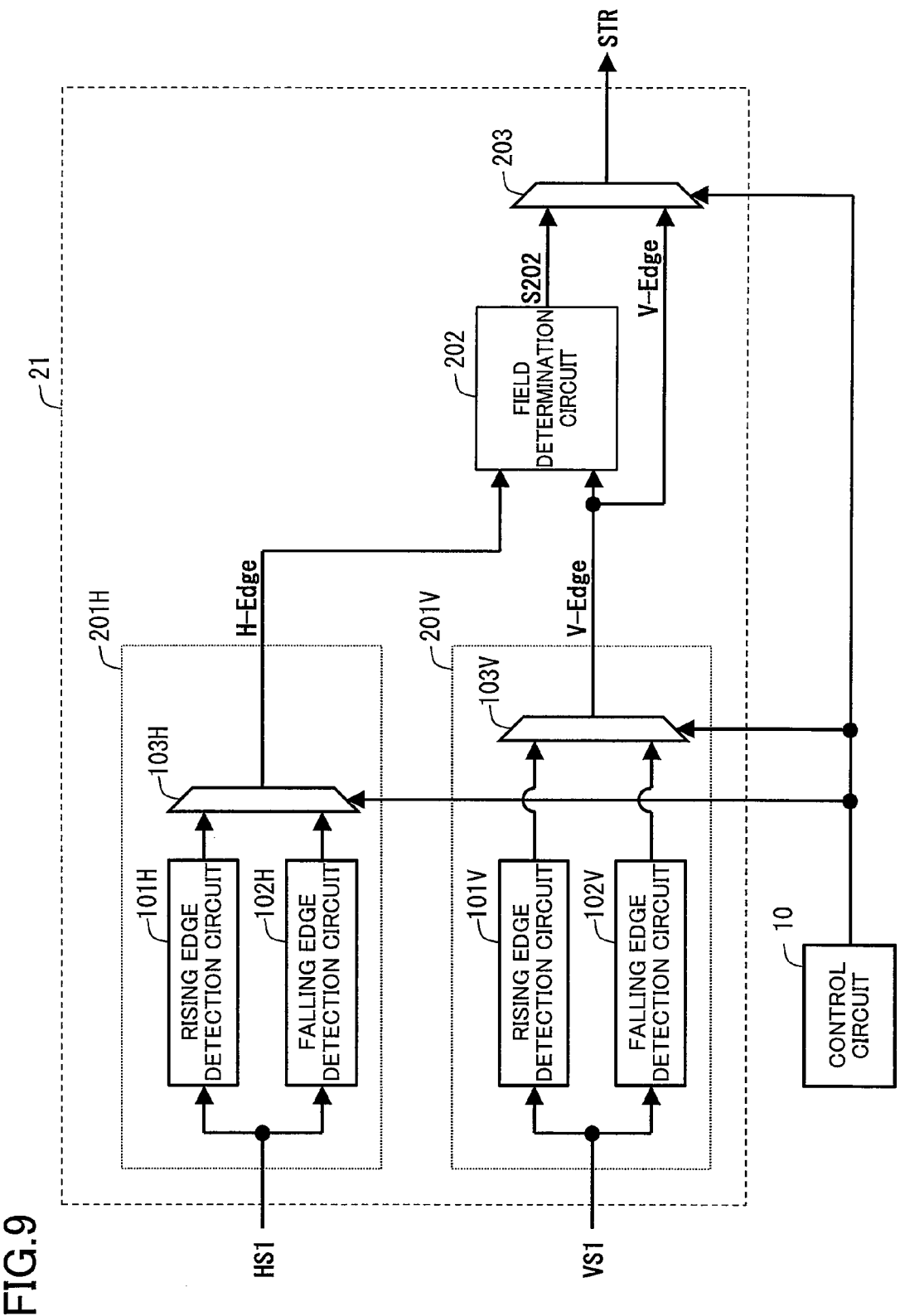
FIG. 9 is a configuration diagram of a transition detection circuit shown in FIG. 8.

FIG. 9 illustrates an example internal configuration of the transition detection circuit 21 shown in FIG. 8. The transition detection circuit 21 includes a horizontal synchronous transition detection circuit 201H detecting transition of the vertical synchronous signal VS1, a vertical synchronous transition detection circuit 201V detecting transition of the vertical synchronous signal VS1, a field determination circuit 202, and a selector 203 operating in response to control by the control circuit 10. When the data signal DATA is a progressive video signal, the control circuit 10 allows the selector 203 to select a detection pulse V-Edge from the vertical synchronous transition detection circuit 201V. When the data signal DATA is an interlaced video signal, the control circuit 10 allows the selector 203 to select an output pulse S202 from the field determination circuit 202.

The vertical synchronous transition detection circuit 201V has a similar configuration to that of the transition detection circuit 11 shown in FIG. 2. The selector 103V outputs the detection pulse V-Edge. The horizontal synchronous transition detection circuit 201H includes a rising edge detection circuit 101H detecting the rising edge of the horizontal synchronous signal HS1, a falling edge detection circuit 102H detecting the falling edge of the horizontal synchronous signal HS1, and a selector 103H operating in response to control by the control circuit 10. For example, when the period of the horizontal synchronous signal HS1 is defined using the rising edge of the horizontal synchronous signal HS1 as a reference, the control circuit 10 allows the selector 103H to select a detection result of the rising edge detection circuit 101H as the detection pulse H-Edge.

[Field Determination]

Figure 10:
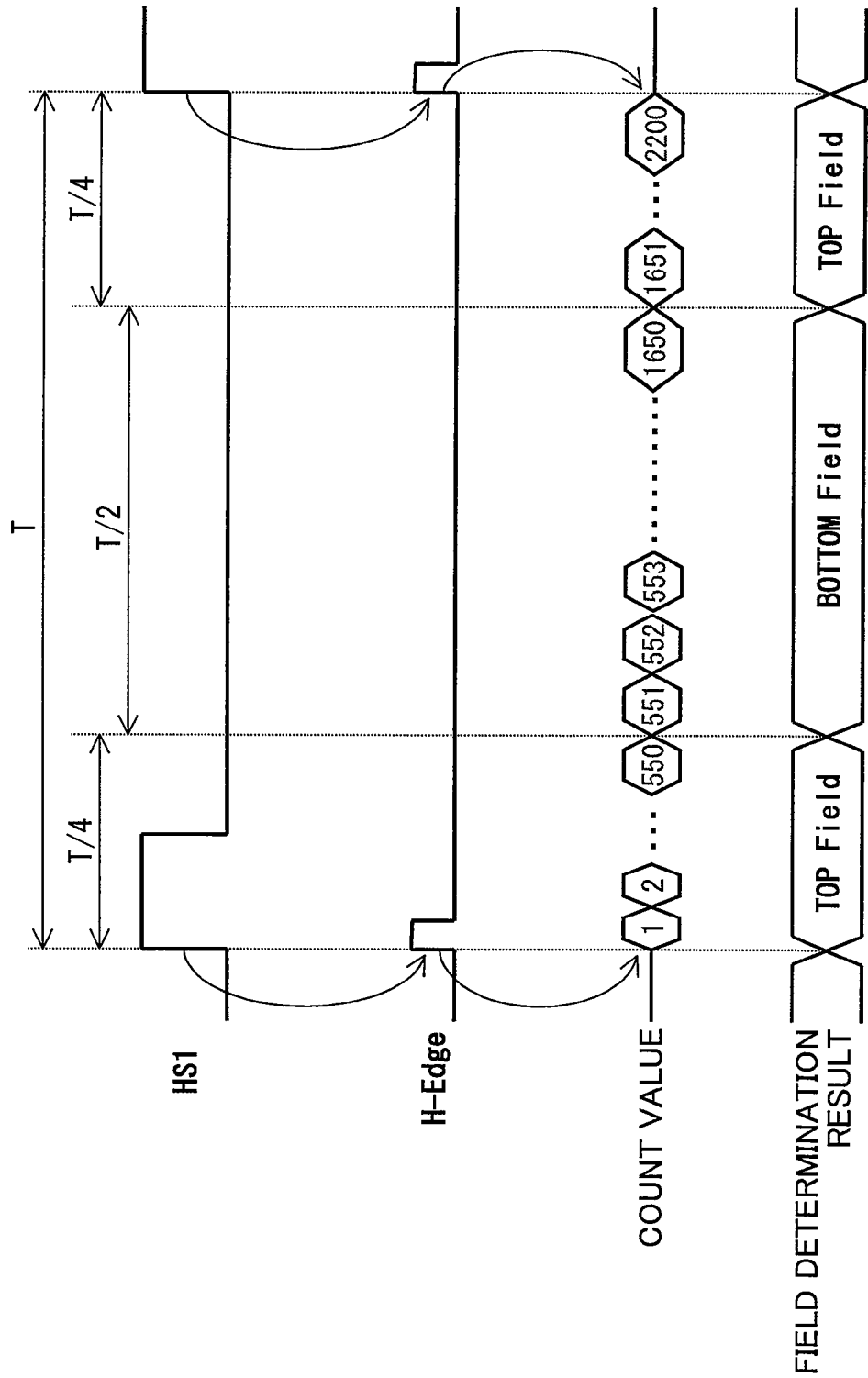
FIG. 10 illustrates field determination by a field determination circuit shown in FIG. 8.

As shown in FIG. 10, the field determination circuit 202 counts the time period (i.e., period T of the horizontal synchronous signal HS1) from the time when a detection pulse H-Edge has been supplied from the horizontal synchronous transition detection circuit 201H to the time when the next detection pulse H-Edge is supplied. Note that FIG. 10 illustrates example determination corresponding to format NTSC 1080i (CEA-861D, format No. 5). If the detection pulse V-Edge is supplied from the vertical synchronous transition detection circuit 201V during the time period in which the count value ranges from "1" to "550," or from "1651" to "2200," (i.e., the time period from the start of the period of the horizontal synchronous signal HS1 to the time point at which a ¼ period has passed, or from the time point at which a ¾ period of the horizontal synchronous signal HS1 has passed to the end of the period), the field determination circuit 202 determines that the field is the top field. On the other hand, the detection pulse V-Edge is supplied from the vertical synchronous transition detection circuit 201V during the period in which the count value ranges from "551" to "1650" (i.e., the time period from the time point at which a ¼ period of the horizontal synchronous signal HS1 has passed to the time point at which a ¾ period has passed), the field determination circuit 202 determines that the field is the bottom field.

As such, the field determination circuit 202 determines whether the transition point of the vertical synchronous signal VS1 corresponds to which the top field or the bottom field based on the position of the transition point of the vertical synchronous signal VS1 between transition points of the horizontal synchronous signal HS1. The time period for the field determination is not limited to the above-described example, and may be determined as appropriate.

As shown in FIG. 11, when determining the field using a first transition point E1 of the vertical synchronous signal VS1, the field determination circuit 202 determines that the first transition point E1 corresponds to the top field. When detecting a third transition point E3 (i.e., the transition point occurring two points after the first transition point E1), the field determination circuit 202 outputs an output pulse S202. On the other hand, when executing field determination using a second transition point E2 of the vertical synchronous signal VS1, the field determination circuit 202 determines that the second transition point E2 corresponds to the bottom field. When detecting the third transition point E3 (i.e., the transition point occurring one point after the second transition point E2), the field determination circuit 202 outputs the output pulse S202.

As such, the field determination circuit 202 outputs the output pulse S202 in response to the transition of the vertical synchronous signal VS1 corresponding to the next top field based on the field determination result. Therefore, the horizontal synchronous signal HS2 and the vertical synchronous signal VS2 can precisely synchronize with the interlaced video signal.

[Error Detection]

Figure 12:
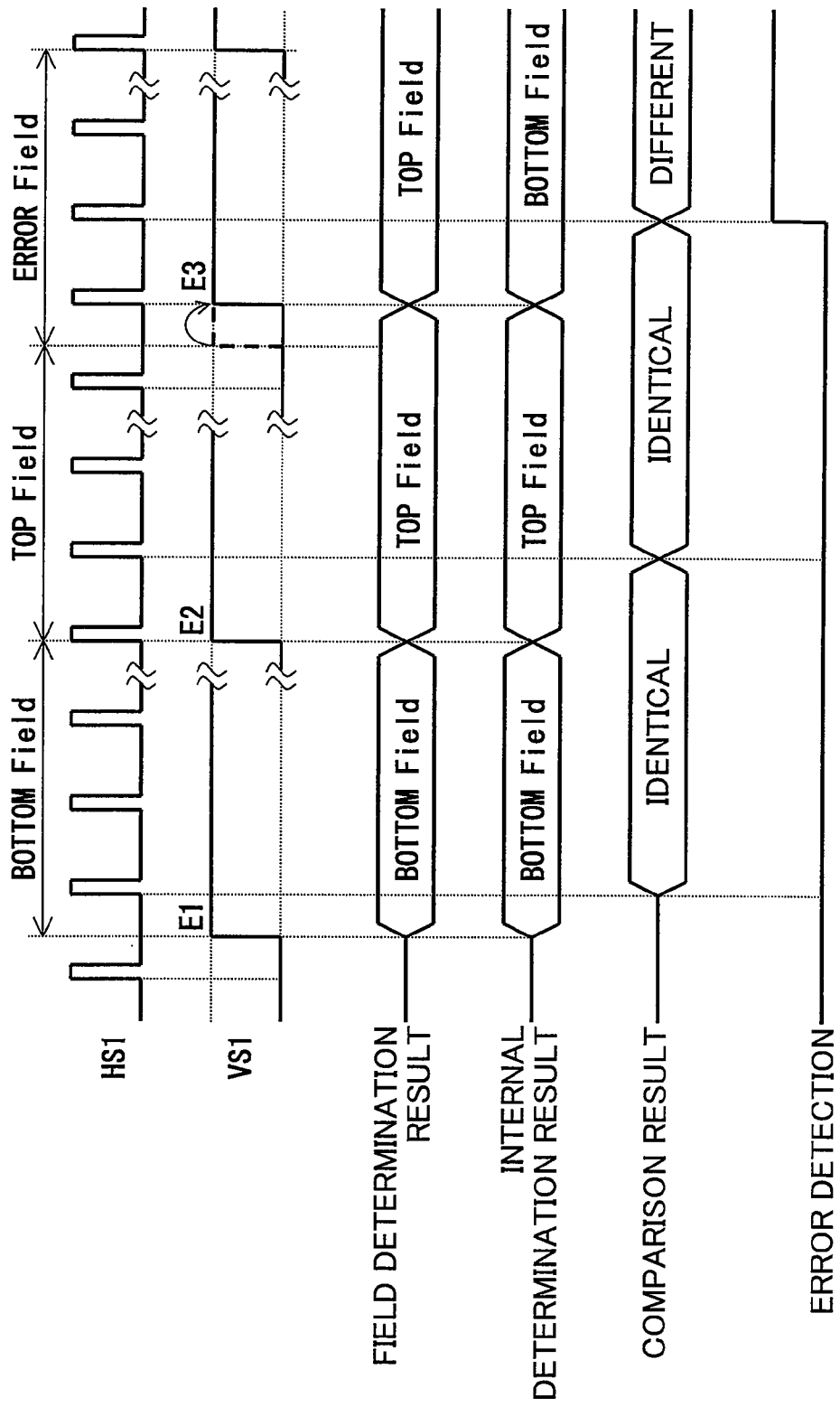
FIG. 12 illustrates error detection by the field determination circuit shown in FIG. 8.

Furthermore, as shown in FIG. 12, after determining that the first transition point E1 of the vertical synchronous signal VS1 corresponds to the bottom field, the field determination circuit 202 stores an internal determination result indicating the bottom field. Then, the field determination circuit 202 compares an actual field determination result with the internal determination result in synchronization with the transition of the horizontal synchronous signal HS1. In this case, no error is detected, since the actual field determination result is identical to the internal determination result.

Then, when the second transition point E2 of the vertical synchronous signal VS1 occurs, the field determination circuit 202 updates the field indicated by the internal determination result from the "bottom field" to the "top field." As such, the field determination circuit 202 inverts the internal determination result at each time when the transition of the vertical synchronous signal VS1 is detected. Furthermore, the field determination circuit 202 determines that the transition point E2 corresponds to the top field, since the transition point E2 coincides with the transition point of the horizontal synchronous signal HS1. Next, the field determination circuit 202 compares the actual field determination result with the internal determination result in synchronization with the transition of the horizontal synchronous signal HS1. Also, in this case, no error is detected, since the actual field determination result is identical to the internal determination result.

Next, when the third transition point E3 of the vertical synchronous signal VS1 occurs, the field determination circuit 202 updates the field indicated by the internal determination result from the "top field" to the "bottom field." On the other hand, the field determination circuit 202 determines that the transition point E3 corresponds to the top field, since the transition point E3 coincides with the transition point of the horizontal synchronous signal HS1. In this case, the field determination circuit 202 determines that an error condition occurs, since the actual field determination result is different from the internal determination result.

As such, when the field determination circuit 202 detects that the determination result indicating the top field and the determination result indicating the bottom field do not occur alternately, the field determination circuit 202 determines that at least one of the horizontal synchronous signal HS1 and the vertical synchronous signal VS1 is in an error condition.

Then, when determining that an error condition occurs, the field determination circuit 202 outputs the output pulse S202 again based on the actual field determination result. As such, when the field is in an error condition, the synchronous signal generation circuit 12 can regenerate the synchronous signals HS2 and VS2.

Third Embodiment

Figure 13:
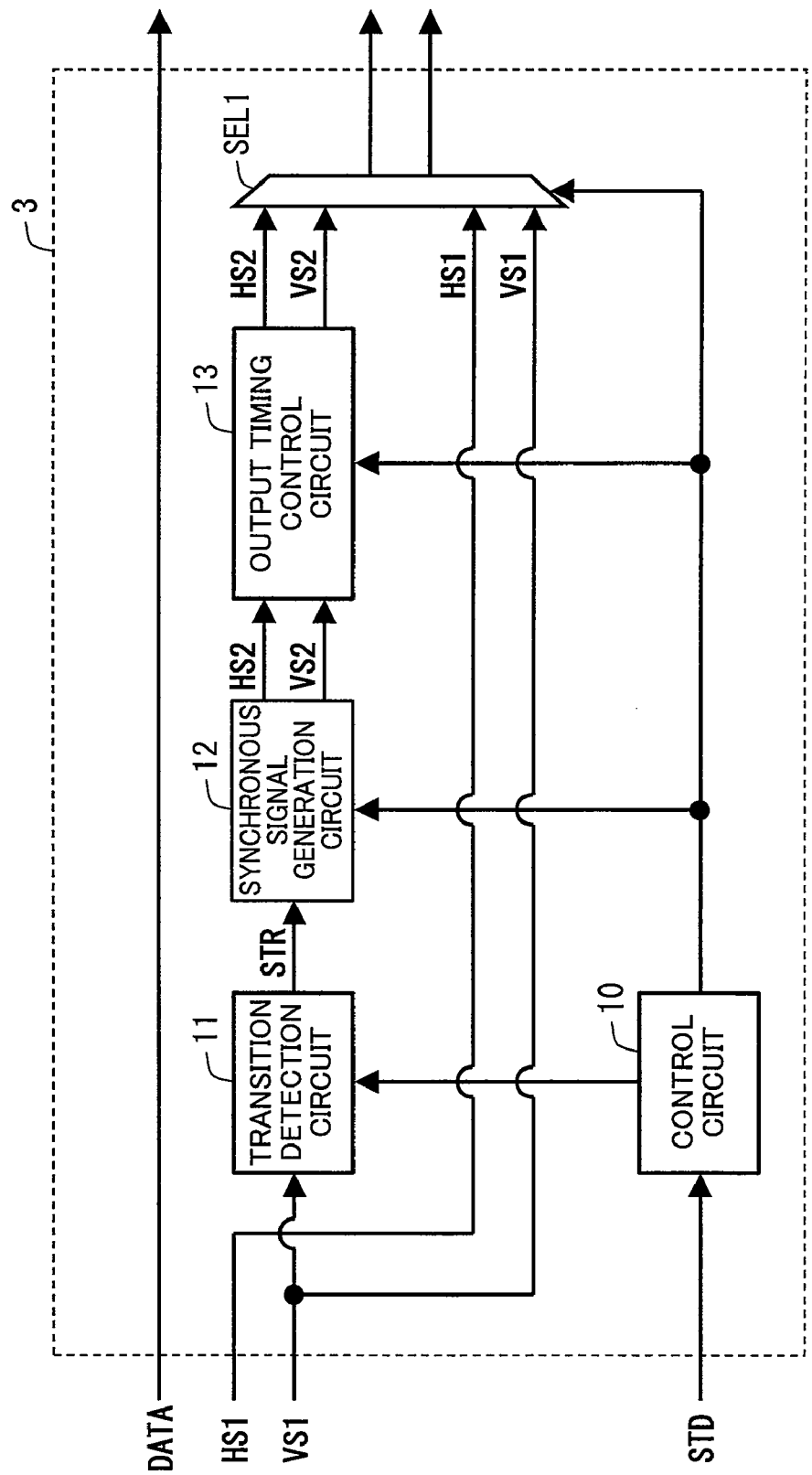
FIG. 13 is a configuration diagram of a synchronous signal conversion circuit according to a third embodiment of the present invention.

FIG. 13 illustrates a configuration of a synchronous signal conversion circuit according to a third embodiment of the present invention. A synchronous signal conversion circuit 3 includes a selector SEL1 operating in response to control by the control circuit 10, in addition to the elements shown in FIG. 1. The control circuit 10 compares a standard indicated by specification information STD (i.e., a standard to which synchronous signals HS1 and VS1 conform) with a standard indicated by standard information (i.e., a standard to which synchronous signals HS2 and VS2 conform). When the standard indicated by the specification information STD is not identical to the standard indicated by the standard information, the control circuit 10 allows the selector SEL1 to select the synchronous signals HS2 and VS2 from the output timing control circuit 13. When the standard indicated by the specification information STD is identical to the standard indicated by the standard information, the control circuit 10 allows the selector to select the synchronous signals HS1 and VS1.

As described above, by outputting the unchanged synchronous signals HS1 and VS1 without any change when there is no need to convert a synchronous signal, the transition detection circuit 11, the synchronous signal generation circuit 12, and the output timing control circuit 13 can be halted, thereby reducing power consumption at the synchronous signal conversion circuit 3.

Variation of Third Embodiment

Figure 14:
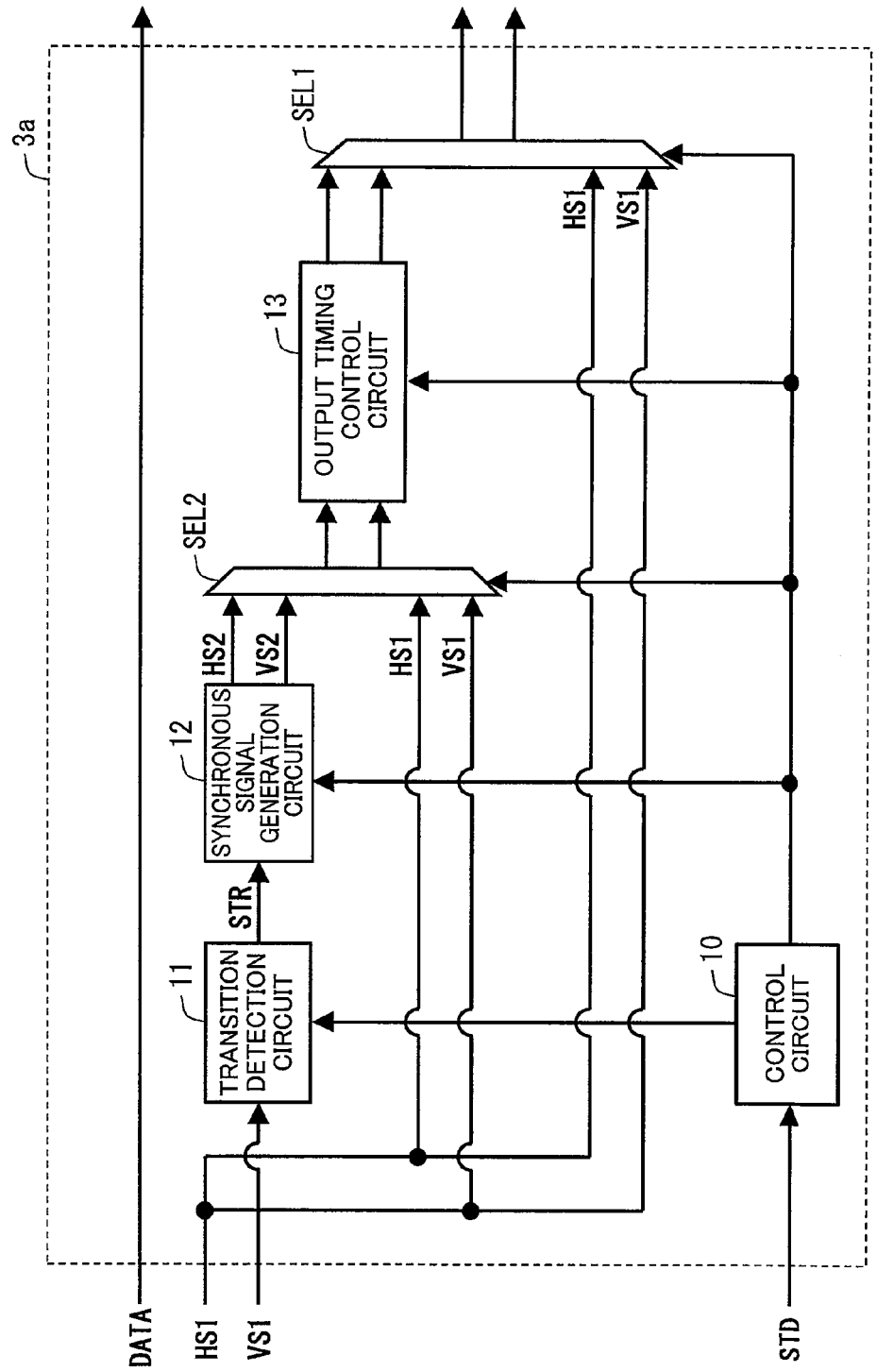
FIG. 14 is a configuration diagram of a variation of the synchronous signal conversion circuit shown in FIG. 13.
Figure 15:
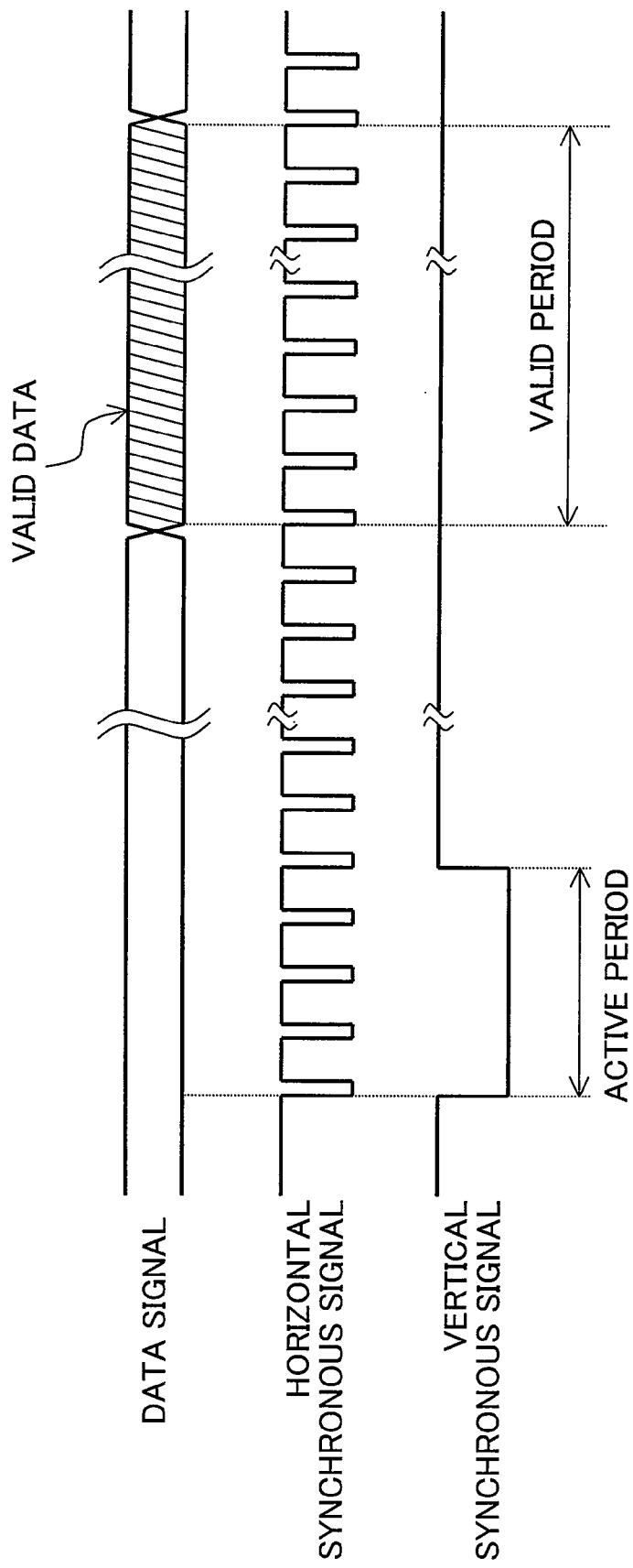
FIG. 15 illustrates a data signal and synchronous signals.

As shown in FIG. 14, the synchronous signal conversion circuit shown in FIG. 13 may further include a selector SEL2 which operates in response to control by the control circuit 10. In a synchronous signal conversion circuit 3a shown in FIG. 14, the control circuit 10 compares the standard indicated by the specification information STD with the standard indicated by the standard information. When the standard indicated by the specification information STD is not identical to the standard indicated by the standard information, the control circuit 10 allows the selector SEL2 to select the synchronous signals HS2 and VS2 from the synchronous signal generation circuit 12. When the position of the valid period is the only difference between the standard indicated by the specification information STD and the standard indicated by the standard information, the control circuit 10 allows the selector SEL2 to select the synchronous signals HS1 and VS1.

Due to this configuration, when there is no need to vary the signal waveforms of the synchronous signals HS1 and VS1, the transition detection circuit 11 and the synchronous signal generation circuit 12 can be halted, thereby further reducing power consumption in the synchronous signal conversion circuit.

Note that the selectors SEL1 and SEL2 shown in FIG. 14 are applicable to the synchronous signal conversion circuit 2 shown in FIG. 8.

Other Embodiments

In the above embodiments, the amount of the difference between parameters (e.g., a time lag between the positions of valid periods) of the synchronous signals HS1 and VS1 supplied from the video signal supply 20 and parameters of the synchronous signals HS2 and VS2 conforming to the standard may be obtained in advance by, e.g., observation of waveforms. Then the information on the amount of the difference between the parameters (difference information) may be supplied from the host computer 40 to the control circuit 10. In this case, the control circuit 10 may control the transition detection circuit 11, the synchronous signal generation circuit 12, and the output timing control circuit 13 based on the difference information. Furthermore, the difference information may be stored in advance in the control circuit 10.

Furthermore, in the above embodiments, the video signal supply 20 may supply synchronous signals conforming to a standard (e.g., the HDMI), and the video signal processing circuit 30 may execute processing conforming to its own specification (i.e., processing not conforming to a standard). That is, the synchronous signal conversion circuit may convert synchronous signals conforming to a standard to synchronous signals conforming to the specification of an existing system. By using such a synchronous signal conversion circuit, an existing system (in this case, the video signal processing circuit 30 not conforming to a standard) can conform to the standard without modifying the specification of the system.

Note that the synchronous signal conversion circuit according to the embodiments is widely applicable not only to video signal processing systems but also to signal processing systems transmitting data signals and synchronous signals.

INDUSTRIAL APPLICABILITY

As described above, the synchronous signal conversion circuit according to the present invention can convert input synchronous signals to synchronous signals conforming to a predetermined standard. Therefore, the circuit is useful for digital apparatuses (e.g., digital televisions, DVD players, digital cameras, and mobile phones) executing data transmission and reception conforming to a predetermined standard.

The invention claimed is:

1. A synchronous signal conversion circuit comprising:

a transition detection circuit configured to detect transition of a first synchronous signal which is transmitted with a data signal;

a synchronous signal generation circuit configured to generate a second synchronous signal, which conforms to a predetermined standard defining, as a valid period of data, a position different from a position of a valid period of data according to specification which is a basis for the first synchronous signal, in response to a detection result by the transition detection circuit; and an output timing control circuit configured to delay the second synchronous signal generated by the synchronous signal generation circuit so that the second synchronous signal synchronizes with the data signal.

2. The synchronous signal conversion circuit of claim 1, further comprising a control circuit configured to receive information which indicates a position of a valid period of the data signal, and determine a delay amount of the output timing control circuit based on a difference between a position of the valid period of the data signal and a position of the valid period defined by the second synchronous signal.

3. The synchronous signal conversion circuit of claim 2, wherein the synchronous signal generation circuit regenerates the second synchronous signal at each time when the transition detection circuit detects transition of the first synchronous signal.

4. The synchronous signal conversion circuit of claim 2, wherein the synchronous signal generation circuit does not regenerate the second synchronous signal even when the transition detection circuit detects transition of the first synchronous signal after the second synchronous signal is generated.

5. The synchronous signal conversion circuit of claim 1, wherein the data signal is a progressive video signal, the first synchronous signal includes a first horizontal synchronous signal and a first vertical synchronous signal, the second synchronous signal includes a second horizontal synchronous signal and a second vertical synchronous signal, and the transition detection circuit detects transition of the first vertical synchronous signal.

6. The synchronous signal conversion circuit of claim 1, wherein:

the data signal is an interlaced video signal having top fields and bottom fields arranged alternately in a time axis, the first synchronous signal include a first horizontal synchronous signal and a first vertical synchronous signal, the second synchronous signal includes a second horizontal synchronous signal and a second vertical synchronous signal, the transition detection circuit includes:

a horizontal synchronous signal transition detection circuit configured to detect transition of the first horizontal synchronous signal;

a vertical synchronous signal transition detection circuit configured to detect transition of the first vertical synchronous signal; and a field determination circuit configured to determine whether a field corresponding to a transition point of the first vertical synchronous signal is the top field or the bottom field based on a position of the transition point of the first vertical synchronous signal between transition points of the first horizontal synchronous signal, and the synchronous signal generation circuit generates the second horizontal synchronous signal and the second vertical synchronous signal in response to a determination result by the field determination circuit.

7. The synchronous signal conversion circuit of claim 6, wherein the field determination circuit determines that at least one of the first horizontal synchronous signal and the first vertical synchronous signal is in an error condition, when detecting that the determination result indicating the top field and the determination result indicating the bottom field are not alternately obtained.

8. The synchronous signal conversion circuit of claim 1, further comprising a first selector configured to select the second synchronous signal delayed by the output timing control circuit when a standard, to which the first synchronous signal conforms, is not identical to the predetermined standard; and select the first synchronous signal when the standard, to which the first synchronous signal conforms, is identical to the predetermined standard.

9. The synchronous signal conversion circuit of claim 8, further comprising a second selector configured to select the second synchronous signal generated by the synchronous signal generation circuit when a standard, to which the first synchronous signal conforms, is not identical to the predetermined standard; and select the first synchronous signal when a position of the valid period is the only difference between the first synchronous signal and a second synchronous signal generated by the synchronous signal generation circuit, and the output timing control circuit delays the synchronous signal selected by the second selector.

10. A signal processing system comprising:

the synchronous signal conversion circuit of claim 1; and a signal processing circuit configured to process the data signal in synchronization with the second synchronous signal from the synchronous signal conversion circuit.

11. A signal processing system comprising:

the synchronous signal conversion circuit of claim 1; and a signal supply circuit configured to supply the first synchronous signal to the synchronous signal conversion circuit.

12. A method of converting a synchronous signal, the method comprising steps of:

(a) detecting transition of a first synchronous signal which is transmitted with a data signal;

(b) generating a second synchronous signal, which conforms to a predetermined standard defining, as a valid period of data, a position different from a position of a valid period of data according to specification which is a basis for the first synchronous signal, in response to a detection result obtained in the step (a); and (c) delaying the second synchronous signal generated in the step (b) so that the second synchronous signal synchronizes with the data signal.

13. A synchronous signal conversion circuit for converting a first synchronous signal, which is transmitted with a data signal, to a second synchronous signal conforming to a predetermined standard, the circuit comprising:

a transition detection circuit configured to detect transition of the first synchronous signal;

a synchronous signal generation circuit configured to generate the second synchronous signal in response to a detection result by the transition detection circuit;

an output timing control circuit configured to delay the second synchronous signal generated by the synchronous signal generation circuit so that the second synchronous signal synchronizes with the data signal; and a control circuit configured to receive information which indicates a position of a valid period of the data signal, and determine a delay amount of the output timing control circuit based on a difference between a position of the valid period of the data signal and a position of the valid period defined by the second synchronous signal, wherein the synchronous signal generation circuit does not regenerate the second synchronous signal even when the transition detection circuit detects transition of the first synchronous signal after the second synchronous signal is generated.

14. A synchronous signal conversion circuit for converting a first synchronous signal, which is transmitted with a data signal, to a second synchronous signal conforming to a predetermined standard, the circuit comprising:

a transition detection circuit configured to detect transition of the first synchronous signal;

a synchronous signal generation circuit configured to generate the second synchronous signal in response to a detection result by the transition detection circuit; and an output timing control circuit configured to delay the second synchronous signal generated by the synchronous signal generation circuit so that the second synchronous signal synchronizes with the data signal, wherein:

the data signal is an interlaced video signal having top fields and bottom fields arranged alternately in a time axis, the first synchronous signal include a first horizontal synchronous signal and a first vertical synchronous signal, the second synchronous signal includes a second horizontal synchronous signal and a second vertical synchronous signal, the transition detection circuit includes:

a horizontal synchronous signal transition detection circuit configured to detect transition of the first horizontal synchronous signal;

a vertical synchronous signal transition detection circuit configured to detect transition of the first vertical synchronous signal; and a field determination circuit configured to determine whether a field corresponding to a transition point of the first vertical synchronous signal is the top field or the bottom field based on a position of the transition point of the first vertical synchronous signal between transition points of the first horizontal synchronous signal, and the synchronous signal generation circuit generates the second horizontal synchronous signal and the second vertical synchronous signal in response to a determination result by the field determination circuit.

15. The synchronous signal conversion circuit of claim 14, wherein the field determination circuit determines that at least one of the first horizontal synchronous signal and the first vertical synchronous signal is in an error condition, when detecting that the determination result indicating the top field and the determination result indicating the bottom field are not alternately obtained.

16. A synchronous signal conversion circuit for converting a first synchronous signal, which is transmitted with a data signal, to a second synchronous signal conforming to a predetermined standard, the circuit comprising:

a transition detection circuit configured to detect transition of the first synchronous signal;

a synchronous signal generation circuit configured to generate the second synchronous signal in response to a detection result by the transition detection circuit an output timing control circuit configured to delay the second synchronous signal generated by the synchronous signal generation circuit so that the second synchronous signal synchronizes with the data signal; and a first selector configured to select the second synchronous signal delayed by the output timing control circuit when a standard, to which the first synchronous signal conforms, is not identical to the predetermined standard; and select the first synchronous signal when the standard, to which the first synchronous signal conforms, is identical to the predetermined standard.

17. The synchronous signal conversion circuit of claim 16, further comprising a first selector configured to select the second synchronous signal delayed by the output timing control circuit when a standard, to which the first synchronous signal conforms, is not identical to the predetermined standard; and select the first synchronous signal when the standard, to which the first synchronous signal conforms, is identical to the predetermined standard.

* * * * *